(12) United States Patent
Coupeté et al.

(10) Patent No.: US 11,308,597 B1
(45) Date of Patent: Apr. 19, 2022

(54) DETECTION OF HAND OBSTRUCTION FOR IMAGE CAPTURE DEVICE

(71) Applicant: GoPro, Inc., San Mateo, CA (US)

(72) Inventors: Eva Coupeté, San Mateo, CA (US); Matias Tassano Ferres, Paris (FR); Nicolas Bessou, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 246 days.

(21) Appl. No.: 16/781,271

(22) Filed: Feb. 4, 2020

(51) Int. Cl.
| | | |
|---|---|---|
| *H04N 5/225* | (2006.01) | |
| *G06T 7/00* | (2017.01) | |
| *H04N 5/232* | (2006.01) | |
| *H04N 9/64* | (2006.01) | |
| *G06T 7/90* | (2017.01) | |

(52) U.S. Cl.
CPC .............. *G06T 7/0002* (2013.01); *G06T 7/90* (2017.01); *H04N 5/2252* (2013.01); *H04N 5/2253* (2013.01); *H04N 5/2254* (2013.01); *H04N 5/23219* (2013.01); *H04N 5/23222* (2013.01); *H04N 9/643* (2013.01); *G06T 2207/10024* (2013.01); *G06T 2207/30168* (2013.01); *G06T 2207/30196* (2013.01)

(58) Field of Classification Search
CPC ..................................................... H04N 5/2252
USPC ........................................................ 348/222.1
See application file for complete search history.

(56) References Cited

U.S. PATENT DOCUMENTS

2014/0375835 A1* 12/2014 Bos .................... H04N 5/23222
348/220.1

* cited by examiner

*Primary Examiner* — Joel W Fosselman
(74) *Attorney, Agent, or Firm* — Esplin & Associates, PC (57) ABSTRACT

An image capture device may detect presence of an on-housing hand within a periphery of a field of view of an optical element during capture of visual content through the optical element. The image capture device may generate an alarm to indicate the presence of the on-housing hand within the periphery of the field of view of the optical element.

18 Claims, 8 Drawing Sheets

DETECTION OF HAND OBSTRUCTION FOR IMAGE CAPTURE DEVICE

FIELD

This disclosure relates to detecting hand obstructions within field of view of image capture device.

BACKGROUND

A user may hold a camera while capturing images or videos. The user's hand may block the view of the camera.

SUMMARY

This disclosure relates to image capture devices that detects hand obstructions. An image capture device may include a housing. The housing may carry one or more of an image sensor, an optical element, and/or other components. The optical element may guide light within a field of view to the image sensor. The image sensor may generate a visual output signal conveying visual information defining visual content based on light that becomes incident thereon. The visual content may be captured through the optical element during a capture duration. Presence of an on-housing hand within a periphery of the field of view of the optical element during the capture duration may be determined based on analysis of a peripheral portion of the visual content and/or other information. Responsive to the presence of the on-housing hand within the periphery of the field of view of the optical element, one or more alarms may be generated. The alarm(s) may indicate the presence of the on-housing hand within the periphery of the field of view of the optical element.

An electronic storage may store visual information defining visual content, information relating to visual content, information relating to optical element, information relating to the field of view of the optical element, information relating to on-housing hand, information relating to alarm, and/or other information.

The housing may carry one or more components of the image capture device. The housing may carry (be attached to, support, hold, and/or otherwise carry) one or more of an image sensor, an optical element, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate detecting hand obstructions. The machine-readable instructions may include one or more computer program components. The computer program components may include one or more of a capture component, a presence component, an alarm component, and/or other computer program components.

The capture component may be configured to capture the visual content during one or more capture durations. The visual content may be captured through the optical element.

The presence component may be configured to determine presence of an on-housing hand within a periphery of the field of view of the optical element during the capture duration. The presence of the on-housing hand within the periphery of the field of view of the optical element may be determined based on analysis of a peripheral portion of the visual content and/or other information.

In some implementations, the peripheral portion of the visual content may be analyzed based on application of a mask to the visual content and/or other information. The application of the mask to the visual content may output the peripheral portion of the visual content.

In some implementations, the analysis of the peripheral portion of the visual content may include comparison of color values in the peripheral portion of the visual content with hand color values. In some implementations, the hand color values may be made darker and/or redder to account for shift in skin tone based on proximity of the on-housing hand to the optical element.

In some implementations, the color values in the peripheral portion of the visual content may be converted from an RGB color space to a YCbCr color space for the comparison.

In some implementations, the comparison of the color values in the peripheral portion of the visual content with the hand color values may output one or more clusters of pixels as potentially depicting the on-housing hand. The cluster(s) of pixels may be filtered based on size to remove one or more outliers.

In some implementations, the analysis of the peripheral portion of the visual content may further include analysis of sharpness of filtered cluster(s) of pixels. The analysis of the sharpness of the filtered cluster(s) of pixels may include comparison of the sharpness of the filtered cluster(s) of pixels with sharpness of pixels in a center portion of the visual content.

The alarm component may be configured to, responsive to the presence of the on-housing hand within the periphery of the field of view of the optical element, generate one or more alarms. The alarm(s) may indicate the presence of the on-housing hand within the periphery of the field of view of the optical element.

In some implementations, the alarm(s) may include an audible alarm, a visible alarm, and/or a haptic alarm. In some implementations, the audible alarm may not be generated responsive to concurrent capture of audio content with the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
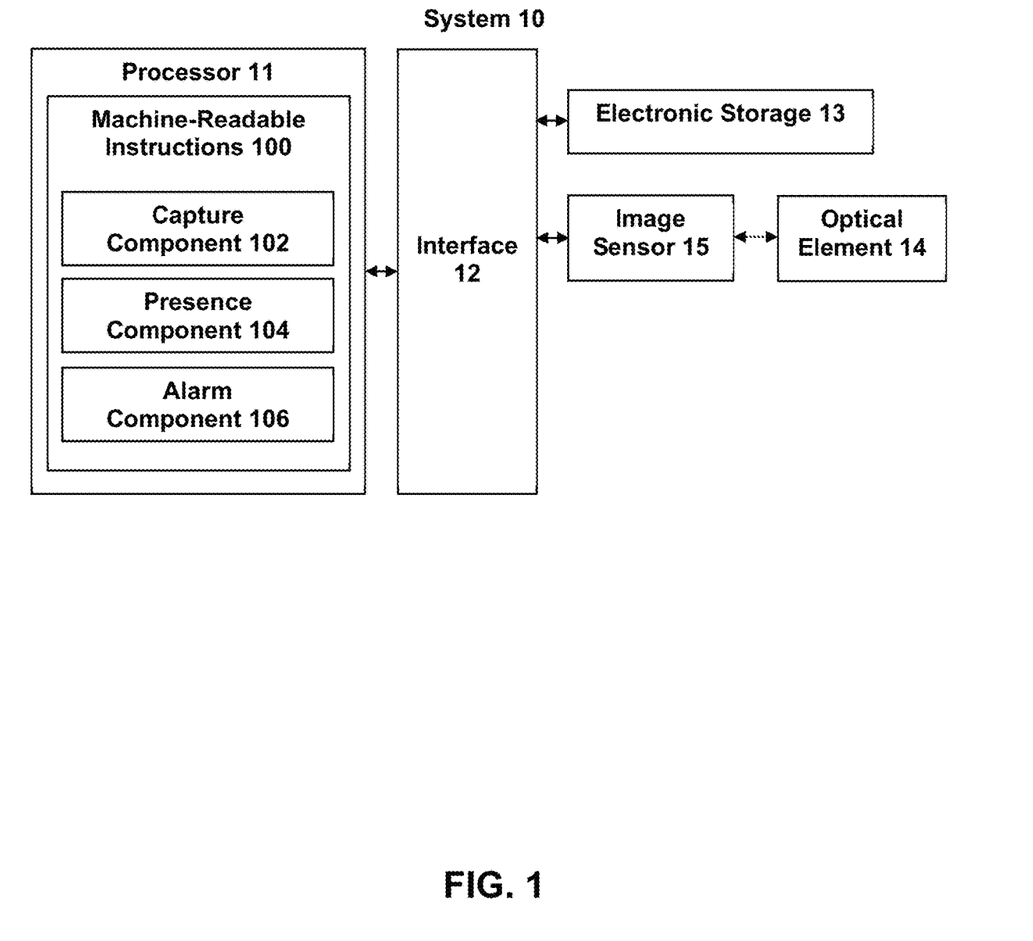
FIG. 1 illustrates an example system that detects hand obstructions.

FIG. 1 illustrates a system 10 for detecting hand obstructions. The system 10 may include one or more of a processor 11, an interface 12 (e.g., bus, wireless interface), an electronic storage 13, an optical element 14, an image sensor 15, and/or other components. The system 10 may include and/or be part of an image capture device. The image capture device may include a housing, and one or more of the optical element 14, the image sensor 15, and/or other components of the system 10 may be carried by the housing the image capture device. The optical element 14 may guide light within a field of view to the image sensor 15. The image sensor 15 may generate a visual output signal conveying visual information defining visual content based on light that becomes incident thereon. The processor 11 may capture the visual content through the optical element 14 during a capture duration. Presence of an on-housing hand within a periphery of the field of view of the optical element 14 during the capture duration may be determined by the processor 11 based on analysis of a peripheral portion of the visual content and/or other information. Responsive to the presence of the on-housing hand within the periphery of the field of view of the optical element, one or more alarms may be generated by the processor 11. The alarm(s) may indicate the presence of the on-housing hand within the periphery of the field of view of the optical element The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to optical element, information relating to the field of view of the optical element, information relating to on-housing hand, information relating to alarm, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14 and/or the image sensor 15, of the system 10 may be carried by the housing of the image capture device.

Figure 3:
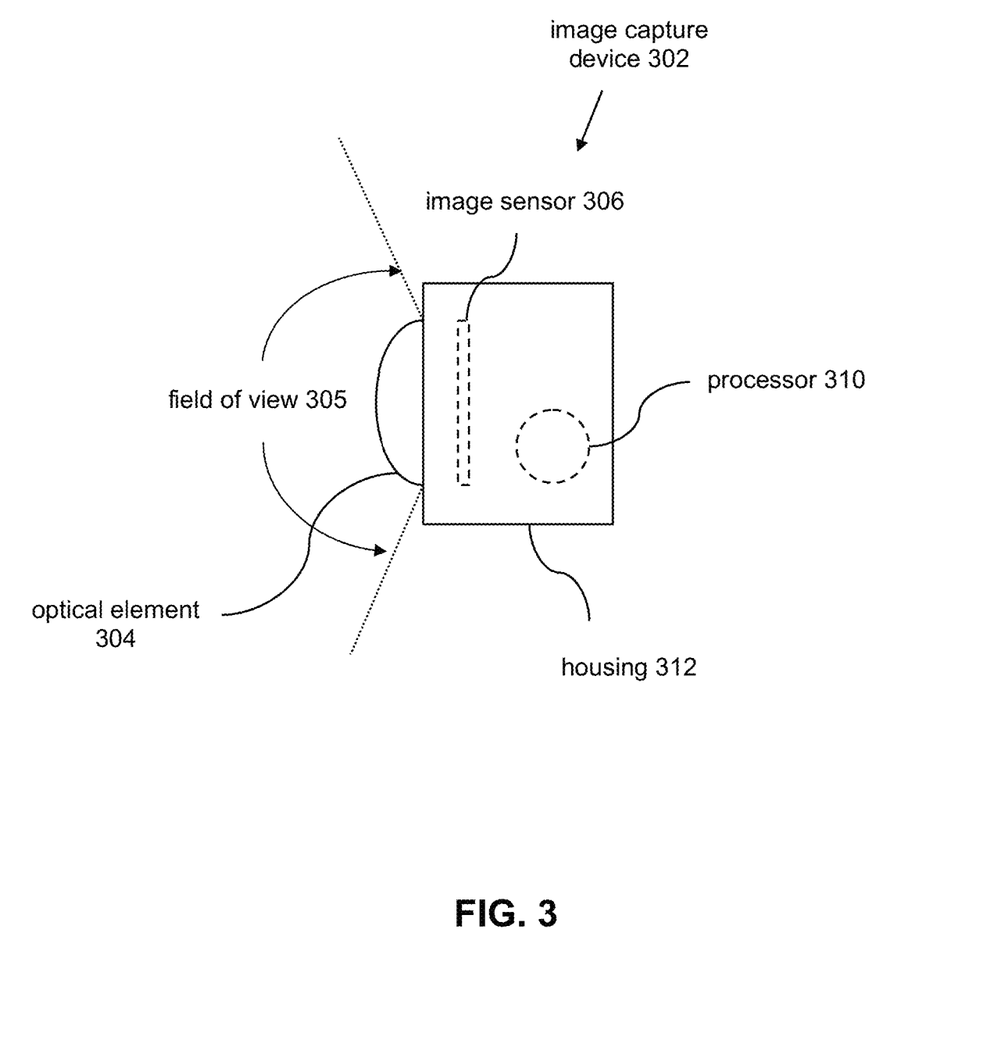
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a processor 310, and/or other components.

One or more components of the image capture device 302 may be the same as, be similar to, and/or correspond to one or more components of the system 10. For example, he processor 308 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The housing may carry other components, such as the electronic storage 13. The image capture device 302 may include other components not shown in FIG. 3, such as one or more of a display, an indictor light, a speaker, a motor, a haptic generator, and/or other components. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may capture visual content through the optical element 304 during a capture duration. The image capture device 302 may determine presence of an on-housing hand within a periphery of the field of view 305 of the optical element 304 during the capture duration.

Responsive to the presence of the on-housing hand within the periphery of the field of view 305 of the optical element 304, the image capture device 302 may generate one or more alarms to indicate the presence of the on-housing hand blocking at least a portion of the field of view 305 of the optical element 304 (hand obstruction).

Presence of an on-housing hand within a periphery of the field of view 305 of the optical element 304 may be determined based on analysis of a peripheral portion of the visual content (considering borders of the image as hand obstructions are likely near the borders of the image), detection of skin tone, sharpness analysis (hand obstructions appear blurry due to closeness to the optical element 304), and/or other information.

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate detecting hand obstructions. The machine-readable instructions 100 may include one or more computer program components. The machine-readable instructions 100 may include one or more of a capture component 102, a presence component 104, an alarm component 106, and/or other computer program components.

The capture component 102 may be configured to capture the visual content during one or more capture durations. The visual content may be captured through one or more optical elements. For example, referring to FIG. 3, the visual content may be captured through the optical element 304. A capture duration may refer to a time duration in which visual content is captured. Capturing visual content during a capture duration may include recording, storing, and/or otherwise capturing the visual content during the capture duration. The visual content may be captured for use in generating images and/or video frames. The visual content may be captured for use in determining the presence of on-housing hand within the periphery of the field(s) of view of the optical element(s). For example, the visual content may be captured for use in determining the presence of on-housing hand within the periphery of the field of view 305 of the optical element 304.

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. In some implementations, the information defining the visual content may be discarded. For instance, the visual information defining the visual content may be temporarily stored for use in determining whether on-housing hand is within the periphery of the field(s) of view of the optical element(s), and the visual information may be deleted after the determination.

The presence component 104 may be configured to determine presence of an on-housing hand within a periphery of the field of view of the optical element during the capture duration. An on-housing hand may refer to a hand that is touching the housing of the image capture device. An on-housing hand may refer to a hand that is holding the housing of the image capture device. An on-housing hand may refer to a hand that is within a certain proximity of the housing of the image capture device and/or an optical element of the image capture device. An on-housing hand may refer to one or more parts of the hand touching/holding the image capture device, such as one or more fingers, palm, and/or other parts of the hand. An on-housing hand may hold the housing of the image capture device in a still position and/or move the housing of the image capture device.

Figure 4:
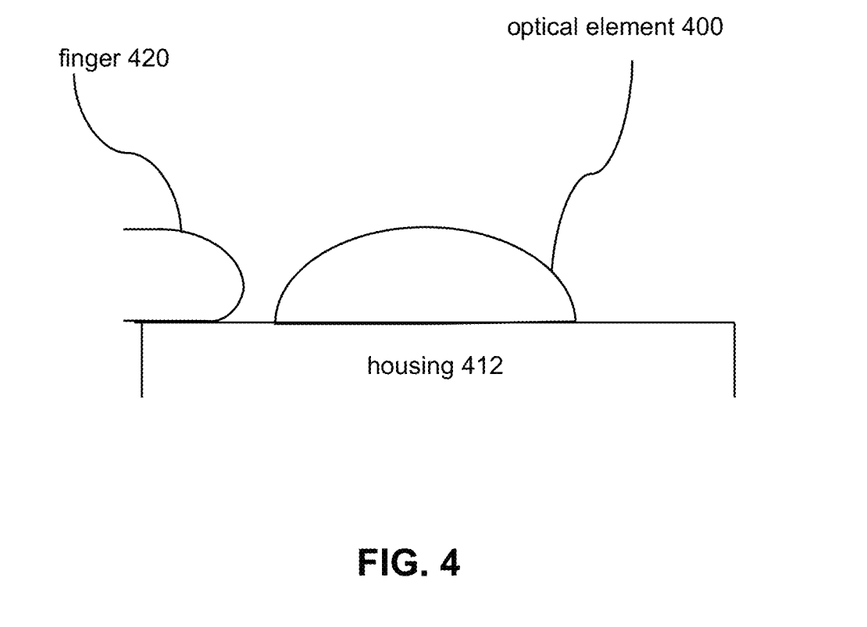
FIG. 4 illustrates an example finger near an optical element of an image capture device.

Presence of an on-housing hand within the visual content (e.g., visual content captured by the image capture device depicting an on-housing hand) may be undesirable. For example, FIG. 4 illustrates an example finger 420 near an optical element 400 of an image capture device. The finger 420 may be within the field of view of the optical element 400, which may result in visual content captured through the optical element 400 depicting the FIG. 420. The FIG. 420 may be depicted within a peripheral portion of the visual content captured through the optical element 400.

Figure 5A:
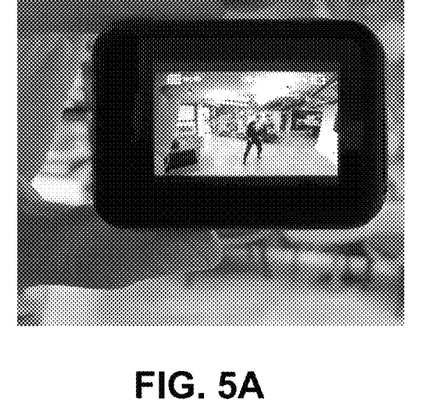
FIGS. 5A and 5B illustrate example hand obstructions.
Figure 5B:
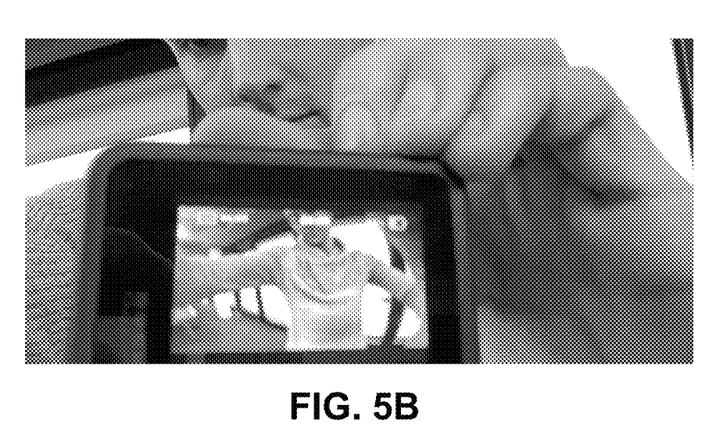

FIGS. 5A and 5B illustrate example hand obstructions. In FIG. 5A, a user may be holding an image capture device by gripping the top and bottom of the housing with two fingers, with the optical element pointed away from the user. The proximity of the user's hand to the optical element of the image capture device may cause the visual content captured through the optical element to depict a portion of the user's palm and bottom portions of two fingers on the left periphery of the visual content. In FIG. 5A, a user may be holding an image capture device by gripping the top and bottom of the housing with five fingers, with the optical element pointed towards the user. The proximity of the user's hand to the optical element of the image capture device may cause the visual content captured through the optical element to depict a portion of the user's palm and a portion of a finger on the right periphery of the visual content.

The presence of the on-housing hand within the periphery of the field of view of the optical element may be determined based on analysis of one or more portions of the visual content and/or other information. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of a single image and/or analysis of visual content of multiple images. For example, visual features and/or visual characteristics of a single image may be analyzed to determine whether the on-housing hand is within the periphery of the field of view of the optical element. Visual features and/or visual characteristics of multiple images (e.g., captured at different moment, captured over a duration of time) may be analyzed to determine whether the on-housing hand is within the periphery of the field of view of the optical element.

For example, the presence of the on-housing hand within the periphery of the field of view of the optical element may be determined based on analysis of a peripheral portion of the visual content and/or other information. A peripheral portion of the visual content may refer to a portion of the visual content along the edge/periphery of the visual content, such as borders of an image. A peripheral portion of the visual content may be defined based on one or more distances from the center of the visual content, one or more distances from the edge/periphery of the visual content, and/or other information. Analysis of the peripheral portion(s) of the visual content may decrease the amount of resources (e.g., power, memory, time) required/consumed to detect hand obstructions by reducing the number of pixels that are analyzed.

In some implementations, a peripheral portion of the visual content may be analyzed based on application of one or more masks to the visual content and/or other information. A mask may refer to an image whose pixel value (e.g., intensity value) is used to select one or more portions of the image (e.g., for analysis). The application of the mask to the visual content may output a peripheral portion of the visual content. For example, the pixels in the center of the visual content (e.g., input image) may be masked by the mask and the pixels in the borders of the visual content may be outputted for analysis.

In some implementations, the analysis of the peripheral portion of the visual content may include comparison of color values in the peripheral portion of the visual content with hand color values. Color values in the peripheral portion of the visual content may include color values of pixels within the peripheral portion of the visual content. Hand color values may refer to color values of pixels that depict a hand. Hand color values may refer to color values of pixels that correspond to skin tone. Hand color values may include one or more ranges/intervals of values that correspond to skin tone.

In some implementations, the hand color values may be modified to account for shift in skin tone based on proximity of the on-housing hand to the optical element. That is, closeness of the hand to the optical element may cause the hand to appear differently than in a typical shot of human skin. For instance, the closeness of the hand to the optical element may cause the hand to appear darker and/or redder, and the hand color values may be made darker and/or redder to account for shift in skin tone based on proximity of the on-housing hand to the optical element. In some implementations, detection of skin tone may be performed by analyzing one or more auto-white balance statistics. Such detection of skin tone may enable detection of varying skin tones.

In some implementations, the color values in the peripheral portion of the visual content may be converted from one color space to another for the comparison with hand color values. For example, the visual content may be defined within an RGB color space, and the color values in the peripheral portion of the visual content may be converted from the RGB color space to a YCbCr color space for the comparison.

In some implementations, the comparison of the color values in the peripheral portion of the visual content with the hand color values may output one or more clusters of pixels as potentially depicting the on-housing hand. A cluster of pixels may include a grouping of neighboring pixels. The cluster(s) of pixels may be filtered based on size to remove one or more outliers. For instance, only clusters of pixels above a defined threshold size may be considered and smaller clusters of pixels may be filtered out from further analysis.

Figure 6A:
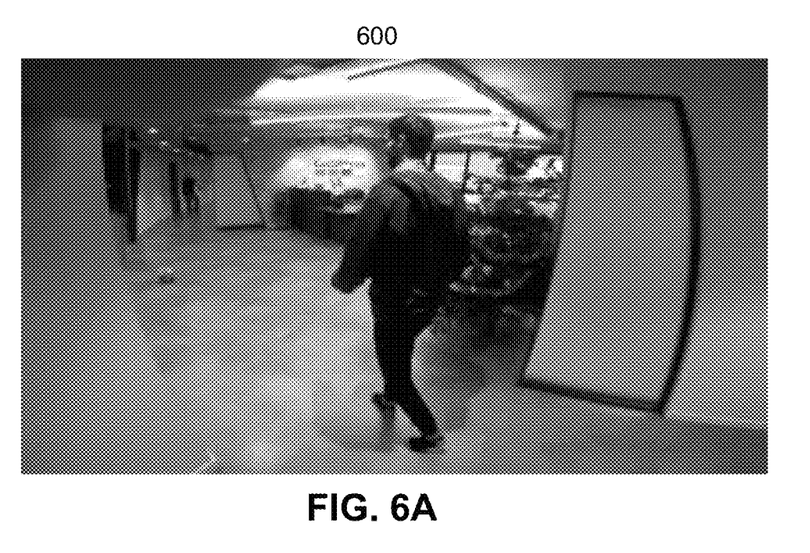
FIG. 6A illustrates an example image including hand obstruction.

FIG. 6A illustrates an example image 600 including hand obstruction. The image 600 may have been captured by a hand-held image capture device. A finger of the user may be positioned within periphery of the field of view of the optical element, and the finger may be depicted in the top left corner of the image 600.

Figure 6B:
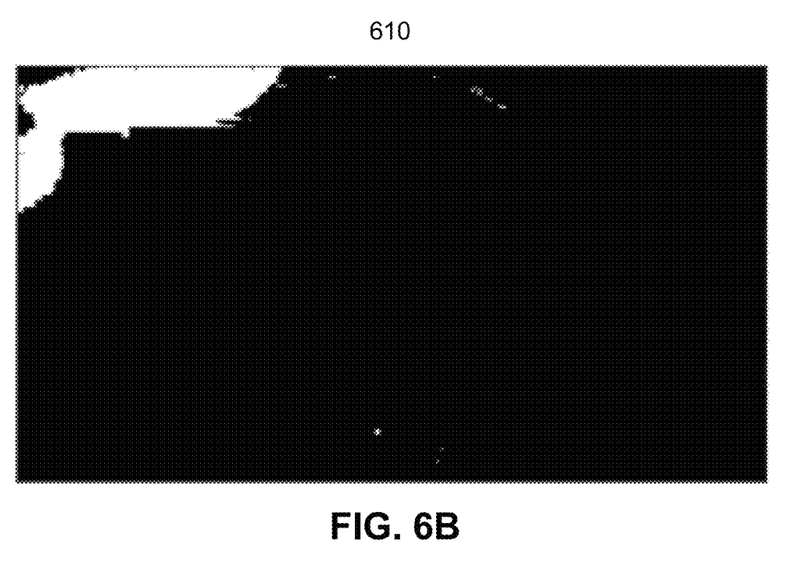
FIG. 6B illustrates an example hand detection.
Figure 6C:
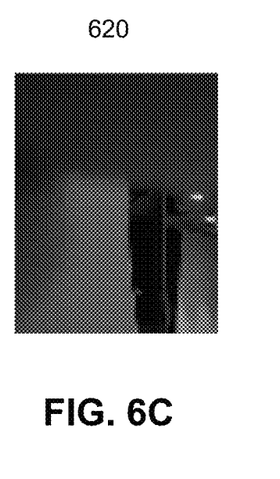
FIG. 6C illustrates an example portion of an image including depiction of a hand.

FIG. 6B illustrates an example hand detection 610. The hand detection 610 may be performed by comparing color values in the peripheral portion of the image 600 with hand color values. White pixels within the hand detection 610 may include pixels with color values that match the hand color values (e.g., same as the hand color values, fall within a range/interval of hand color values). White pixels within the hand detection 610 may form clusters of pixels, and the clusters of pixels may be filtered based on size to keep clusters above a size threshold. For instance, in FIG. 6B, size filtering may result in only the top left cluster of pixels being retained for hand detection analysis. FIG. 6C illustrates a cropped image 620 of the top left cluster of pixels retained for hand detection analysis.

In some implementations, the analysis of the peripheral portion of the visual content may further include analysis of sharpness of filtered cluster(s) of pixels. The clusters of pixels above a size threshold may be analyzed to determine sharpness of pixels within the clusters. Sharpness of pixels may refer to overall clarity of pixels in terms of focus and/or contrast. A sharp cluster of pixels may depict things clearly, with texture and/or contrast rendered in high detail. A blurry cluster of pixels may not depict things clearly, with texture and/or contrast rendered in low detail. The close proximity of the on-hand housing to the optical element may cause the depicting of the on-hand housing within the visual content to be blurry. For instance, as shown in FIG. 6C, the portion of the image 620 depicting the finger close to the optical element may be blurry.

Determining sharpness of the filtered cluster(s) of pixels may enable comparison of the sharpness of the filtered cluster(s) of pixels with one or more other pixels within the visual content. For example, the analysis of the sharpness of the filtered cluster(s) of pixels may include comparison of the sharpness of the filtered cluster(s) of pixels with sharpness of pixels in a center portion of the visual content. The on-housing hand may not obstruct the center portion of the optical element even when the on-housing hand is obstructing the peripheral portion of the optical element, resulting in the center portion of the visual content depicting things clearly/more clearly than in the peripheral portion of the visual content depicting on-housing hand. The sharpness of the filtered cluster(s) of pixels in the peripheral portion of the visual content may be compared to the sharpness of the pixels in the center portion, and the relative sharpness/difference in sharpness of pixels in the two portions may be used to determine whether or not the filtered cluster(s) of pixels depict the on-housing hand. Using the comparison of sharpness may enable more accurate obstruction detection. For example, an image may be noisy, which may impact the sharpness determination. The sharpness of the center portion may be used as a reference and may provide information on the amount of noise and/or contextual information for the image. Using the comparison of sharpness may enable accurate obstruction detection even within noisy images.

In some implementation, the sharpness of the pixels may be determined based on total variation within an image to evaluate level of sharpness. The total variation within an image may include the sum of absolute values of derivatives of the image. In some implementations, the sharpness of the pixels may be determined based on variance of the Laplacian (sum of unmixed second partial derivatives) of the image. The Laplacian may provide information on the amount of texture in the image, and may be given by:

$$\Delta f = \sum_{i=1}^{n} \frac{\partial^2 f}{\partial x_i^2}$$

The variance of the Laplacian may be used to quantify the amount of texture in the different portions of the image (e.g., the center portion, the filtered cluster(s) of pixels in the peripheral portion). High variance may correspond to depiction with high texture detail. Other determinations of pixel sharpness are contemplated.

The variance of Laplacian for pixels in the center portion of the visual content with the variance of Laplacian for filtered cluster(s) of pixels in the peripheral portion of the visual content may be compared to determine whether the filtered cluster(s) of pixels depict the on-housing hand, and thereby determine whether or not the on-housing hand is within the periphery of the field of view of the optical element. For example, the on-housing hand may be determined to be within the periphery of the field of view of the optical element based on the Laplacian variance for pixels in the center portion being greater than a multiple/factor of the Laplacian variance for filtered cluster(s) of pixels in the peripheral portion. The value of the multiple/factor may be adjusted to tune the sensitivity of the hand detection. Other analysis to determine presence of on-housing hand within the periphery of the field of view of the optical element are contemplated.

The alarm component 106 may be configured to, responsive to the presence of the on-housing hand within the periphery of the field of view of the optical element, generate one or more alarms. For example, referring to FIG. 3, the alarm component 106 may be configured to generate one or more alarms responsive to a determination that an on-housing hand is within the periphery of the field of view 305 of the optical element 304. An alarm may refer to a signal (for attention), a warning, a message, and/or other types of communication for bringing attention to a thing, a circumstance, and/or a situation. The alarm component 106 may generate the alarm(s) as data, electronic signal, and/or physically observable event (e.g., through one or more user interface devices, such as a display, a speaker, and/or a vibration generator/motor).

An alarm may indicate the presence of the on-housing hand within the periphery of the field of view of the optical element. For example, the alarm(s) generated by the alarm component 106 may indicate that an on-housing hand is within the periphery of the field of view 305 of the optical element 304. An alarm may include a warning to one or more users of the image capture device that there is a hand obstructing the view of the image capture device (obstructing field of view of optical element). In some implementations, an alarm may be specific as to which portions of the optical element is obstructed. For example, an alarm may be a general alarm that some part of the view of the optical element is obstructed by the hand, or an alarm may be specific as to which part (e.g., top part, bottom part, side part, corner part) of the view of the optical element is obstructed by the hand. In some implementations, an alarm may be specific as to which of the optical elements are obstructed. For example, the image capture device may include multiple lens, and an alarm may be a general alarm that a hand is obstructing some or all of the optical elements, or an alarm may be specific as to which of the optical elements is obstructed by hand. Such provision of alarm may enable the user(s) to remove/prevent hand obstructions during capture of visual content.

An alarm may include an audible alarm, a visible alarm, a haptic alarm, and/or other alarm. An audible alarm may refer to an alarm that is audibly provided. An audible alarm may be provided using sound. For example, responsive to detecting presence of an on-housing hand within a periphery of a field of view of an optical element, the image capture device may generate and/or playback sounds (using speaker(s) of the image capture device) that the hand is obstructing the optical element. The audible alarm may include words (e.g., words describing hand obstructing the optical element, words instructing the user to remove obstructing hand from field of view of the optical element), non-word sounds (e.g., beeping noise, music), and/or other sounds.

A visible alarm may refer to an alarm that is visibly provided. A visible alarm may be provided using light. For example, responsive to detecting presence of an on-housing hand within a periphery of a field of view of an optical element, the image capture device may generate light (using display(s) and/or indicator light(s) of the image capture device) associated with the hand obstructing the optical element. The visible alarm may include one or more colors, static and/or dynamic light (e.g., blinking light), depiction of words (e.g., presenting on display(s) statement about hand obstructing the optical element, presenting on display(s) statement instructing the user to remove obstructing hand from field of view of the optical element), and/or other visible alarm.

A haptic alarm may refer to an alarm that is haptically provided. A haptic alarm may be provided using touch and/or motion. For example, responsive to detecting presence of an on-housing hand within a periphery of a field of view of an optical element, the image capture device may be vibrated (using motor(s) and/or haptic generator(s) of the image capture device). The vibration of the image capture device may include continuous vibration (for a period of time) and/or periodic vibration. The vibration may indicate to the user of the image capture device that the hand is obstructing the optical element. Use of other haptics are contemplated.

In some implementations, an alarm may be turned off responsive to removal of the obstructing hand. An alarm may be turned off responsive to the obstructing hand being removed so that the on-housing hand is no longer within a periphery of a field of view of an optical element. For example, referring to FIG. 3, when the capture of image(s)/video(s) are initialed on the image capture device 302, the peripheral portion of the visual content may be analyzed to determine whether an on-housing hand is obstructing the optical element 304. An alarm may be generated responsive to the on-housing hand obstructing the optical element 304, and the peripheral portion of subsequently captured visual content may be analyzed to determine when the obstructing hand is moved out of the periphery of the field of view 305 of the optical element 304. When the removal of the obstructing hand is detected, the alarm may be turned off.

In some implementations, an alarm may be turned off responsive to passage of an alarm duration. An alarm duration may refer to a duration of time for which alarm is provided (e.g., visually, audibly, haptically). After passage of this duration of time, the alarm may be turned off In some implementations, different types of alarm may be generated/not generated responsive to the type of capture being performed by the image capture device. For example, the audible alarm may not be generated responsive to concurrent capture of audio content with the visual content. For instance, the image capture device may be used to capture both video and audio at the same time, and an audible alarm may be recorded into the captured audio. Inclusion of audio alarm in the captured audio content may not be desirable, and the alarm component 106 may generate visible alarm instead. The audible alarm may be generated responsive to non-concurrent capture of audio content with the visual content. For instance, the image capture device may be used to capture image/video without audio. The alarm component 106 may generate audible alarm (e.g., instead of another alarm, in addition to another alarm) based on non-concurrent capture of audio content with the visual content.

Figure 7:
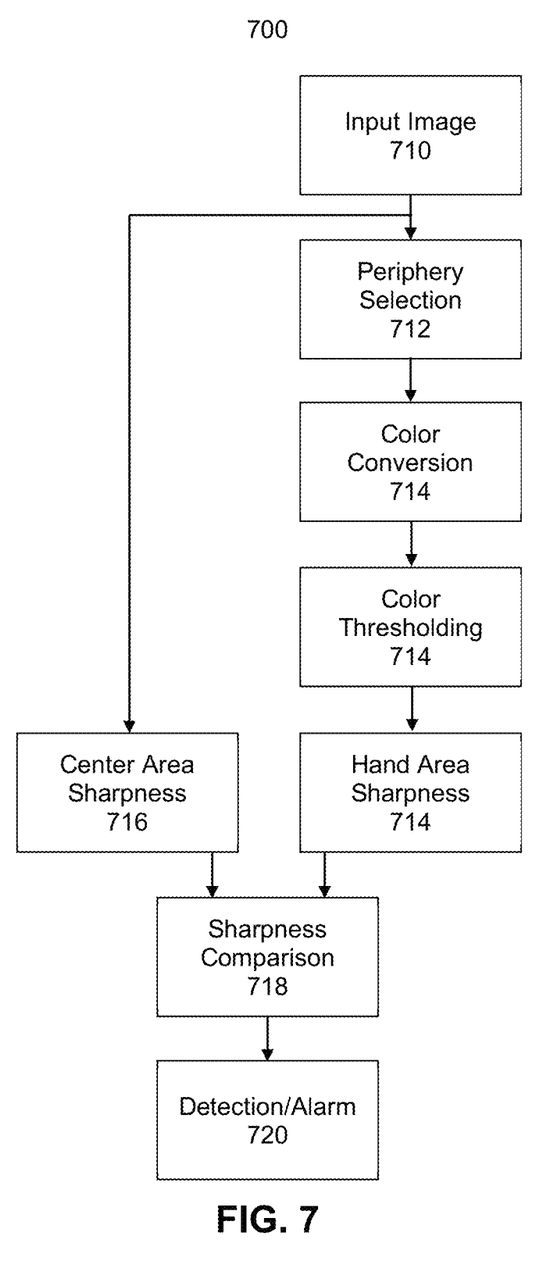
FIG. 7 illustrates an example flow for hand detection and alarm generation.

FIG. 7 illustrates an example flow 700 for hand detection and alarm generation. The flow 700 may begin with an input image 700. The input image 700 may be captured through an optical element (e.g., lens) of an image capture device. At periphery selection 712, the peripheral portion (e.g., border) of the image may be selected for analysis, such as by application of a mask. Color conversion 714 may be performed to convert color values in the peripheral portion from one color space (e.g., RGB) to a YCbCr color space. Coloring thresholding 714 may include comparison of the Y, Cb, and Cr values to value ranges/intervals that define skin colors/tones. The coloring thresholding 714 may perform skin detection within the peripheral portion of the image. The results of the skin detection (clusters of pixels) may be filtered based on size to remove small outliers. Hand area sharpness 714 may be computed for the portion(s) of the image determined to potentially depict skin, and center area sharpness 716 may be computed for a center portion of the image. Sharpness comparison 718 may be performed to compare sharpness of the center portion of the image with the sharpness of the portion(s) of the image determined to potentially depict skin. At detection/alarm 720, the presence of a hand obstructing the optical element may be detected and an alarm may be generated. The hand detection/alarm generation may be performed based on the sharpness comparison 718, such as based on the sharpness level of the portion(s) of the image potentially depicting skin being lower than/being a fraction of the sharpness level of the center portion of the image.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
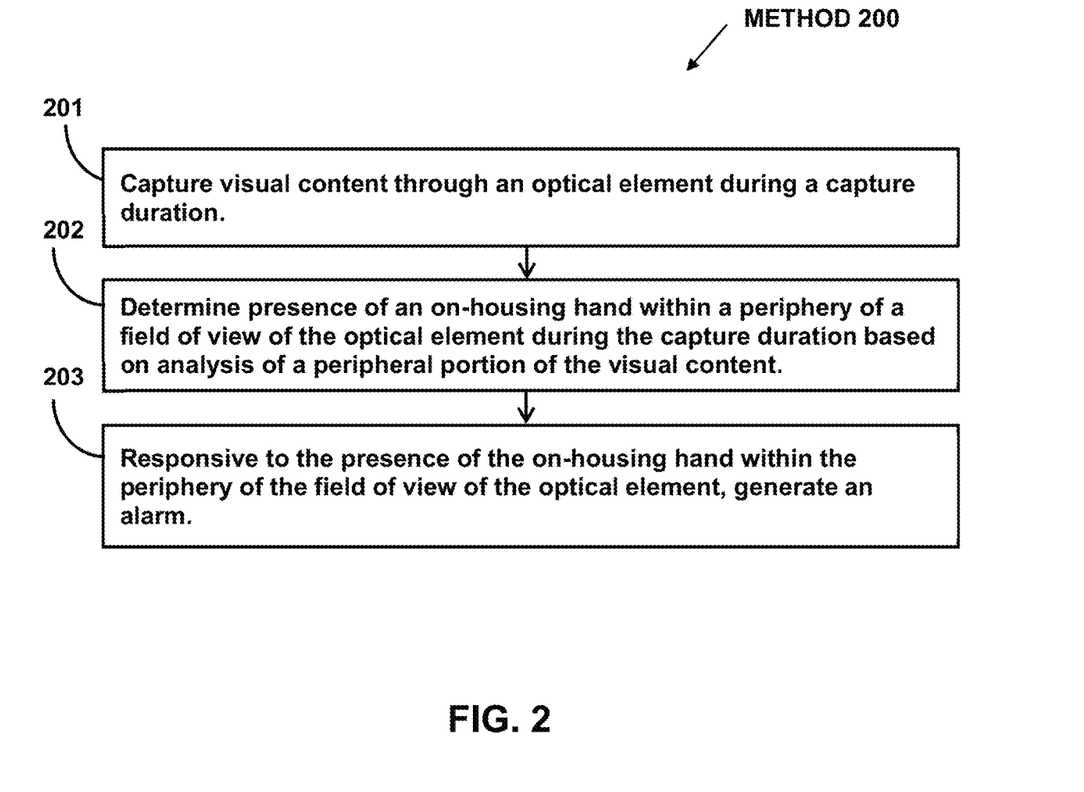
FIG. 2 illustrates an example method for detecting hand obstructions.

FIG. 2 illustrates method 200 for detecting hand obstructions. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, An image capture device may include a housing. The housing may carry one or more of an image sensor, an optical element, and/or other components. The optical element may guide light within a field of view to the image sensor. The image sensor may generate a visual output signal conveying visual information defining visual content based on light that becomes incident thereon.

At operation 201, the visual content may be captured through the optical element during a capture duration. In some implementation, operation 201 may be performed by a processor component the same as or similar to the capture component 102 (Shown in FIG. 1 and described herein).

At operation 202, presence of an on-housing hand within a periphery of the field of view of the optical element during the capture duration may be determined based on analysis of a peripheral portion of the visual content and/or other information. In some implementations, operation 202 may be performed by a processor component the same as or similar to the presence component 104 (Shown in FIG. 1 and described herein).

At operation 203, responsive to the presence of the on-housing hand within the periphery of the field of view of the optical element, an alarm may be generated. The alarm may indicate the presence of the on-housing hand within the periphery of the field of view of the optical element. In some implementations, operation 203 may be performed by a processor component the same as or similar to the alarm component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for detecting hand obstruction, the image capture device comprising:
   a housing;
   an image sensor carried by the housing and configured to generate a visual output signal conveying visual information based on light that becomes incident thereon, the visual information defining visual content;
   an optical element carried by the housing and configured to guide light within a field of view to the image sensor; and
   one or more physical processors configured by machine-readable instructions to:
      capture the visual content during a capture duration, the visual content captured through the optical element;
      determine presence of an on-housing hand within a periphery of the field of view of the optical element during the capture duration based on analysis of a peripheral portion of the visual content, wherein the analysis of the peripheral portion of the visual content includes comparison of color values in the peripheral portion of the visual content with hand color values; and
      responsive to the presence of the on-housing hand within the periphery of the field of view of the optical element, generate an alarm indicating the presence of the on-housing hand within the periphery of the field of view of the optical element.

2. The image capture device of claim 1, wherein the peripheral portion of the visual content is analyzed based on application of a mask to the visual content, the application of the mask outputting the peripheral portion of the visual content.

3. The image capture device of claim 1, wherein the hand color values are made darker and redder to account for shift in skin tone based on proximity of the on-housing hand to the optical element.

4. The image capture device of claim 1, wherein the color values in the peripheral portion of the visual content are converted from an RGB color space to a YCbCr color space for the comparison.

5. The image capture device of claim 1, wherein the comparison of the color values in the peripheral portion of the visual content with the hand color values outputs one or more clusters of pixels as potentially depicting the on-housing hand, and the one or more clusters of pixels are filtered based on size to remove one or more outliers.

6. The image capture device of claim 5, wherein the analysis of the peripheral portion of the visual content further includes analysis of sharpness of one or more filtered clusters of pixels.

7. The image capture device of claim 6, wherein the analysis of the sharpness of the one or more filtered clusters of pixels includes comparison of the sharpness of the one or more filtered clusters of pixels with sharpness of pixels in a center portion of the visual content.

8. The image capture device of claim 1, wherein the alarm includes an audible alarm, a visible alarm, and/or a haptic alarm.

9. The image capture device of claim 8, wherein the audible alarm is not generated responsive to concurrent capture of audio content with the visual content.

10. A method for detecting hand obstruction, the method performed by an image capture device including one or more processors, an image sensor, and an optical element, the image sensor configured to generate a visual output signal conveying visual information based on light that becomes incident thereon, the visual information defining visual content, the optical element configured to guide light within a field of view to the image sensor the method comprising:
  capturing the visual content during a capture duration, the visual content captured through the optical element;
  determining presence of an on-housing hand within a periphery of the field of view of the optical element during the capture duration based on analysis of a peripheral portion of the visual content, wherein the analysis of the peripheral portion of the visual content includes comparison of color values in the peripheral portion of the visual content with hand color values; and
  responsive to the presence of the on-housing hand within the periphery of the field of view of the optical element, generating an alarm indicating the presence of the on-housing hand within the periphery of the field of view of the optical element.

11. The method of claim 10, wherein the peripheral portion of the visual content is analyzed based on application of a mask to the visual content, the application of the mask outputting the peripheral portion of the visual content.

12. The method of claim 10, wherein the hand color values are made darker and redder to account for shift in skin tone based on proximity of the on-housing hand to the optical element.

13. The method of claim 10, wherein the color values in the peripheral portion of the visual content are converted from an RGB color space to a YCbCr color space for the comparison.

14. The method of claim 10, wherein the comparison of the color values in the peripheral portion of the visual content with the hand color values outputs one or more clusters of pixels as potentially depicting the on-housing hand, and the one or more clusters of pixels are filtered based on size to remove one or more outliers.

15. The method of claim 14, wherein the analysis of the peripheral portion of the visual content further includes analysis of sharpness of one or more filtered clusters of pixels.

16. The method of claim 15, wherein the analysis of the sharpness of the one or more filtered clusters of pixels includes comparison of the sharpness of the one or more filtered clusters of pixels with sharpness of pixels in a center portion of the visual content.

17. The method of claim 10, wherein the alarm includes an audible alarm, a visible alarm, and/or a haptic alarm.

18. The method of claim 17, wherein the audible alarm is not generated responsive to concurrent capture of audio content with the visual content.

* * * * *